United States Patent [19]
Furihata

[11] 3,866,602
[45] Feb. 18, 1975

[54] ENDOSCOPE CAMERA WITH ORIENTATION INDICATOR
[75] Inventor: Hiroyuki Furihata, Tokyo, Japan
[73] Assignee: Olympus Optical Co., Ltd., Tokyo, Japan
[22] Filed: May 29, 1974
[21] Appl. No.: 474,198

[30] Foreign Application Priority Data
May 29, 1973 Japan............................. 48-63125

[52] U.S. Cl..................................... 128/6, 354/105
[51] Int. Cl.............................................. A61b 1/06
[58] Field of Search................................. 128/4-9; 356/248; 350/10, 19, 319; 354/104, 105, 109, 63, 72

[56] References Cited
UNITED STATES PATENTS
2,273,876  2/1942  Lutz et al............................ 356/248
3,266,393  8/1966  Chitayat............................. 354/105
3,525,561  8/1970  Takahashi........................... 350/10
3,608,547  9/1971  Sato et al............................ 128/6

Primary Examiner—Richard A. Gaudet
Assistant Examiner—Henry S. Layton

[57] ABSTRACT

An endoscope has a camera for photographing that image corresponding to the interior wall of a body cavity of a patient which is received through the surface of a distal end section. A mark is provided at the inner peripheral surface of an image passing hole of a plate mask or near the image passing hole of the plate mask. The mark is intentionally asymmetrically located with respect to a symmetrical axis of the image passing hole of the plate mask. As a result, the shadow of the plate mask including the mark is photographed, together with the image, onto the film strip.

9 Claims, 12 Drawing Figures

PATENTED FEB 18 1975

ENDOSCOPE CAMERA WITH ORIENTATION INDICATOR

BACKGROUND OF THE INVENTION

This invention relates to an endoscope having a distal end section adapted to be inserted into the internal wall of a body cavity of a patient for medical observation or diagnosis.

Such an endoscope is referred to as what is called a camera-equipped endoscope. There are two types of endoscope: one having a camera housed within a distal end section and one having a camera mounted external to a proximal end section. In any case, an image of the internal wall of a body cavity is received, through a view window provided at the outer surface of the distal end section, into the endoscope and photographed through a mask onto a film strip. The mask performs the function of defining the area of the image so that the image is clearly photographed onto a film strip. The mask has an image passing hole through which a beam of light corresponding to the image is passed in a manner to correspond to the shape of the image passing hole. As a result, the image is photographed, in a form similar to the size of the image passing hole, onto the film strip. A spherical or square image passing hole is usually provided in the mask so that a wide area of image is presented onto the film strip. Such a simple design saves time in the manufacture of the mask having such image passing hole. However, problems arise due to the simple design of the image passing hole. That is, when the image so photographed is later observed for diagnosis, it is inadvertently viewed either in an inverted position or upside down. As a result, the position of an affected portion of a body organ is erroneously viewed with the attendant erroneous diagnosis. Such a situation is due in part to the fact that the film is very small and due in part to the fact that the images photographed onto the film strip are observed frame by frame in an amplified form using a projector. When an individual imaged film frame is set on the projector, difficulty is presented in determining whether or not it is set in a correct position. The imaged film surface can be usually identified based on whether it is an emulsion surface or not. In such situations, however, such an identification will be almost impossible.

SUMMARY OF THE INVENTION

It is accordingly the general object of this invention to provide an endoscope capable of observing an image in a correct position by providing at least one mark at the inner periphery of an image passing hole of a mask or near the image passing hole thereof in a manner to be asymmetrical with respect to at least one symmetrical axis of the image passing hole. According to this invention at least one small mark is asymmetrically located with respect to at least one symmetrical axis of an image passing hole, for example, spherical or rectangular, of the mask. The mark is either a small projection provided at the inner periphery of the image passing hole of the mask, or an aperture provided near the image passing hole of the mask. The mask, per se, used in the endoscope according to this invention is simple in construction and low in cost.

An object of this invention is to provide an endoscope having a photographing means for permitting the correct position of an image to be easily identified.

Another object of this invention is to provide an endoscope equipped with a photographing means having a mask simple in construction and low in cost.

DESCRIPTION OF THE PREFERRED EMBODIMENTS

Figure 1:
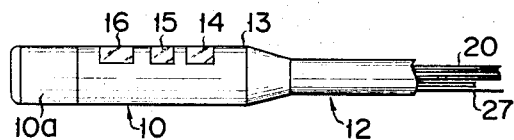
FIG. 1 is a side view showing the distal end section of a camera-equipped endoscope according to this invention.
Figure 2:
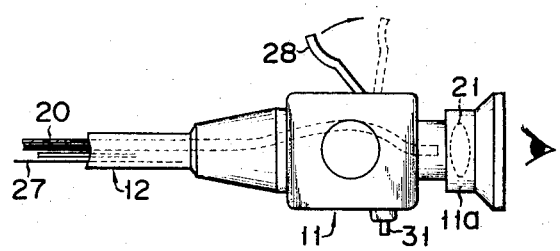
FIG. 2 is a side view showing the proximal end section of a control unit of the endoscope of FIG. 1.
Figure 3:
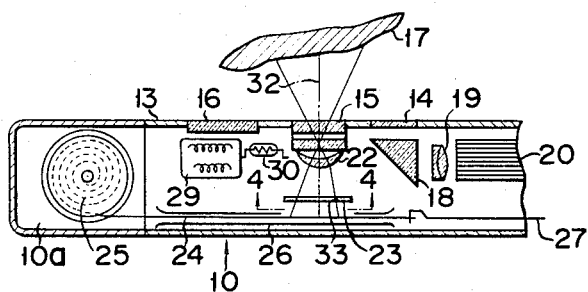
FIG. 3 is an enlarged, sectional side view showing the distal end section of FIG. 1.

FIGS. 1–3 show an endoscope according to this invention in which a camera is mounted within a distal end section 10. A flexible tube section 12 connects the distal end section 10 to a control unit 11 of the proximal end of the endoscope. At a side surface 13 of the distal end section 10, a view window 14, photographing window 15 and illumination window 15 are located parallel to one another. The distal end section 10 connected to the flexible tube section 12 is guided into the interior of a body cavity or body organ of a patient by operation at the control unit 11. An image corresponding to the portion of the internal wall 17 of the body is optically trransmitted from the view window 14, through a prism 18 and objective lenses 19 and then through an image guide 20 consisting of a plurality of optical fibers, to the control unit 11. The image appearing at the image delivering end of the image guide 20 can be observed through an eyepiece 21 arranged within a section 11a of the control unit 11. An image corresponding to the portion of the internal wall 17 of the body cavity is transmitted through the window 15 to a set of photographing lenses 22 constituting an optical means. Behind the photographing lenses 22 a plate mask 23 and a film strip 24 are sequentially disposed in a direction substantially perpendicular to an optical axis 32 indicated by a dot and dash line in FIG. 3. The film strip 24 is disposed within the distal end section 10 in a manner to be movable along the length of the distal end section 10. The base end of the film strip 24 is wound around a film loading cassette 25. The free end of the film strip 24 is guided along a film guide plate 26 and extends toward the flexible tube section 12, and it is anchored to one end of a film delivery wire 27. The other end of the wire 27 is connected through the flexible tube section 12 to a film take-up lever 28 provided at the control unit 11. Though a mechanism for connecting the wire 27 to the lever 28 is not shown, the film strip 24 is intermittently delivered frame by frame from the cassette 25 through the wire 27 by moving the lever 28 from a position shown in a solid line to a position shown in a dot-chain line.

Behind the illumination window 16, an illumination lamp 29 and light sensitive element 30 are incorporated within the distal end section 10 in a manner to be electrically connected to each other. The illumination lamp 29 has a filament adapted to be lighted only when an observation is made through the view window 14 and a filament adapted to be lighted only when an internal wall 17 of the body cavity is photographed through the window 15. The light sensitive element 30 serves to detect a reflecting light of the illumination lamp 29 and control the exposure time of an image projected onto the film strip 24. The terminals, not shown, of the lamp 29 and light sensitive element 30 are connected to one end of an electrical connection which extends through the flexible tube section 12 into the control unit 11. The other end of the electrical connection is connected to a terminal 31 provided at the control unit 11. The terminal 31 leads to a power source, not shown. Images of the internal wall 17 of the body cavity are received through the view window 15 and photographed frame by frame on the film strp 24 which, together with the cassette 24, illumination lamp 29 and light sensitive element 30, constitutes a photographing means.

Figure 4A:
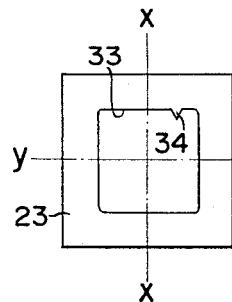
FIG. 4A is an enlarged plan view, taken along line 4—4 of FIG. 3, showing a mask used in this invention.
Figure 4B:
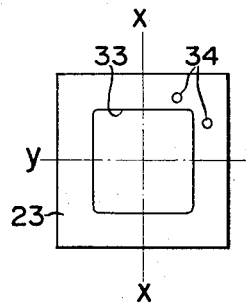
FIGS. 4B–4F are enlarged plan views showing modifications of the mask used in this invention.
Figure 4C:
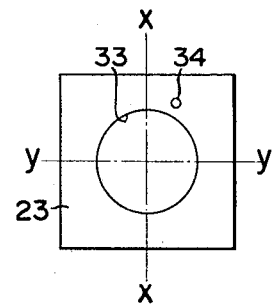
Figure 4D:
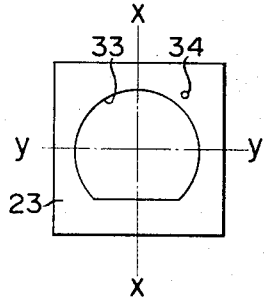
Figure 4E:
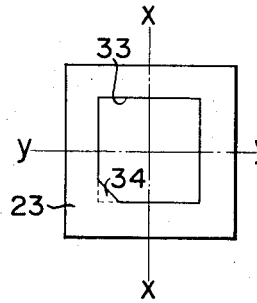

A forward end portion 10a of the distal end section 10 is detachably mounted to the main body of the distal end section 10 and houses the film loaded cassette 25. After photograph has been taken in a desired number of frames, the cassette 25 is taken out for replacement by removing the forward end portion 10a away from the main body of the distal end section 10. The plate mask 23 arranged substantially perpendicularly to the optical axis 32 indicated by a dot and dash line in FIG. 3 takes the forms, for example, as shown in FIG. 4A. In FIG. 4A the plate mask 23 is square in its outer configuration and has a square image passing hole 33 whose four corners are slightly rounded. The image passing hole 33 has a vertical symmetrical axis x—x and horizontal symmetrical axis y—y, both axes being indicated by dot and dash lines in FIG. 4A. A beam of light reflected from the inner wall 17 of the body cavity is passed through the plate mask 23, where it is so restricted in its cross section as to correspond to the square shape of the image passing hole 33. As a result, an image similar to the square shape of the image passing hole 33 is projected onto the film strip 24. The plate mask 23 has a small mark or triangular projection 34 provided at one inner peripheral section of the square-shaped image passing hole 33. The triangular projection 34 extends toward the inside of the image passing hole 33. When the plate mask 23 as shown in FIG. 4A is used, the image 35 is photographed, together with the shadow of the triangular projection, onto one frame 24a of the film strip. The triangular projection or mark 34 is intentionally asymmetrically positioned with respect to the vertical and horizontal axes, as shown in FIG. 4A. When the image 35 photographed onto the frame of the film strip 24 is viewed together with the shadow 34a of the triangular projection 34, the observer can easily identify the correct position of the mark 34 and image 35 by knowing the position of the mark 34 and the image 35 is not inadvertently viewed from an inverted position, nor it is taken upside down. Therefore image 35 photographed onto the frame of the film strip 24 can be observed in a correct position using a projector.

Figure 4F:
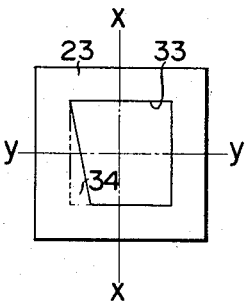
Figure 5:
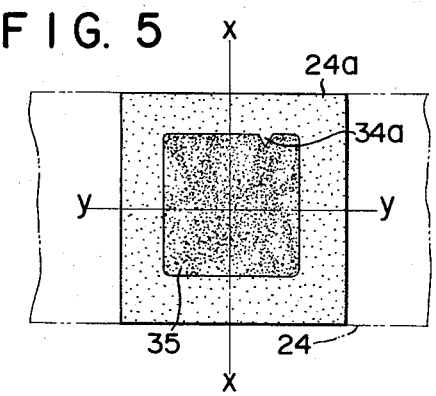
FIG. 5 is a plan view showing one frame of a film strip photographed through the mask of FIG. 4.

FIGS. 4B–4F show a variety of plate masks usable in the endoscope according to this invention. The plate mask 23 shown in FIG. 4B has a square-shaped image passing hole 33 having symmetrical axes x—x and y—y. Two marks 34 or small apertures are provided asymmetrically with respect to the symmetrical axes x—x and y—y and in proximity to the image passing hole 33. The two marks 34 are photographed onto the individual frame of the film strip 24 as identification marks and perform the same function as the triangular projection 34 of the plate mask 23 of FIG. 4A. The plate mask of FIG. 4B suggests that one or more marks 34 may be provided in the plate mask 23. A plate mask 23 shown in FIG. 4C has a circular-shaped image passing hole 33 having axes x—x and y—y. Such a circular-shaped image passing hole presents a difficulty in observing an image in a correct position. According to this invention, however, a single aperture or mark 34 is provided asymmetrically with respect to the symmetrical axes x—x and y—y of the image passing hole and in proximity to the circular hole 33. The mark 34 performs the same function as the above-mentioned marks 34 of the mask plates of FIGS. 4A and 4B. A plate mask 23 shown in FIG. 4D has a semi-circular shaped image passing hole 33 having a symmetrical axis x—x. In this case, the same difficulty is encountered in observing an image in a correct position, since the image passing hole is symmetrical with respect to the symmetrical axis x—x. To avoid such a difficulty, a mark 34 is asymmetrically provided with respect to the symmetrical axis x—x of the image passing hole 23. The mark 34 performs the same function as the marks shown in FIGS. 4A–4B. However, the mask plate 23 having such a semi-circular shaped image passing hole 33 will not actually used and it is to be noted that such mask plate 23 is shown only by way of example. A plate mask 23 shown in FIG. 4E has a square-shaped image passing hole 33 and a mark 34. The mark 34 can be regarded as a triangular projection provided at one imaginal corner-shown in a phantom line in FIG. 4E-of the square-shaped image passing hole 33. The triangular projection is asymmetrically provided with respect to symmetrical axes x—x and y—y of the image passing hole so that an image can be viewed in a correct position. A plate mask 23 shown in FIG. 4F is a modification of the mask plate of FIG. 4E. The mask plate 23 has a square-shaped image passing hole 33 including one imaginal corner shown in a phantom line in FIG. 4F and a mark 34 extending from one imaginal corner of the image passing hole 33 toward another corner thereof. The mark 34 can also be regarded as a triangular projection provided at one imaginal corner of the image passing hole 33. Since the mark 34 is asymmetrically provided with respect to symmetrical axes x—x and y—y of the image passing hole 33, an image can be viewed in a correct position. The image passing hole may be rectangular or oblong in shape.

The shadows of the mask plates 23 shown in FIGS. 4B–4F will be able to be easily imagined from the shadow of the plate mask 23 shown in FIG. 3.

Though no detailed arrangement of the mask 23 and its associated parts is not shown in FIG. 3, the mounting of the mask 23 and its associated parts within the distal end section 10 will easily occur to those skilled in the art and, therefore, any detailed explanation is omitted.

Figure 6:
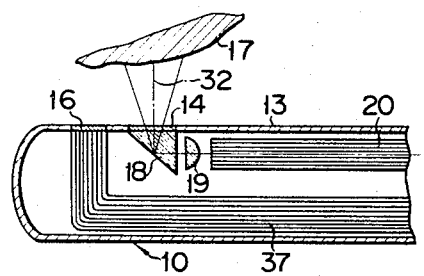
FIG. 6 is a sectional side view showing the distal end section of another camera-equipped endoscope according to this invention.
Figure 7:
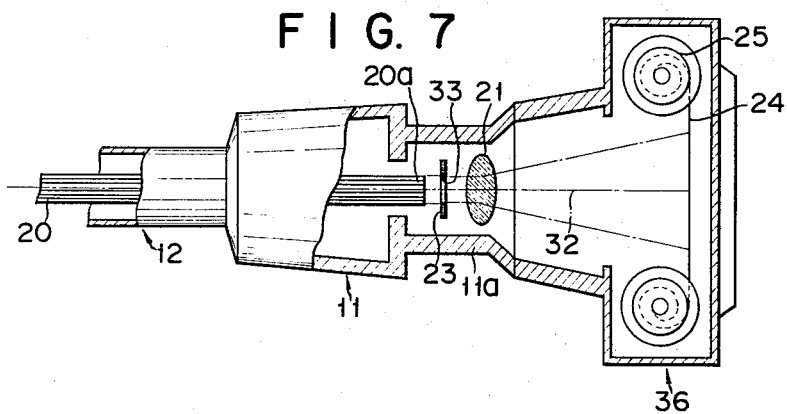
FIG. 7 is a side view, partially broken away, showing the endoscope of FIG. 6 having the camera at the proximal end.

FIGS. 6 and 7 show an endoscope in which a camera 36 is mounted external to the proximal end. The same reference numerals are employed to designate parts or elements corresponding to those shown in FIGS. 1-3.

In this embodiment a plate mask 23 is arranged behind an eyepiece 21 within a section 11a of a control unit 11 and substantially perpendicular to the optical axis 32 of an image. The camera 36 for photographing an image of the inner wall 17 of a body cavity of a patient is connected to the section 11a as shown in FIG. 7 and a film strip 24 extending within the camera 36 is arranged substantially perpendicular to the optical axis 32 of the image. An image of the internal wall 17 of the body cavity is transmitted, through a view window 14 provided at the side surface 13 of the distal end section 10 and through a prism 18, objective lens 19 and image guide 20 to the eyepiece 21 and then projected through a plate mask 23 onto the film strip 24. When the image is passed through the plate mask 23, the beam of light corresponding to the image conforms to the shape of an image passing hole 33 of the plate mask 23. As a result, the image, as well as the shadow of the plate mask 23 including a mark 34, is photographed onto the film strip 24. Since the mark 34 is asymmetrically provided with respect to at least one symmetrical axis of the image passing hole 33 of the plate mask 23, the image can be viewed in a correct position using a projector.

The arrangement of the plate mask 23 and its associated parts within the section 11a of the proximal end section is roughly shown as in the case of FIG. 3.

In FIGS. 6 and 7 a reference numeral 37 shows a light guide for illumination. One end of the light guide 37 leads to an illumination window 16 provided at a side surface 13 of the distal end section 10 and the other end of the light guide 37 extends through a flexible tube section 12 into the control unit 11, where it is connected to a light source (not shown). The endoscope belongs to a conventional structure and any detailed disclosure is, therefore, omitted. A film loaded cassette 25 as shown in FIG. 7 is not widely different from that used in a conventional camera.

What is claimed is:

1. An endoscope having a distal end section adapted to be inserted into a body cavity of a patient for medical diagnosis, comprising an optical means optically receiving an image of the internal wall of the body cavity through the surface of the distal end section into the interior of the endoscope; a photographing means having a film strip arranged substantially perpendicular to an optical axis of the image so received; a plate mask located in front of the film strip and substantially perpendicular to the optical axis of the image and having an image passing hole for permitting a beam of light corresponding to the image to be passed therethrough with the cross section of the beam of light defined to correspond to the shape of the image passing hole, said image passing hole having at least one symmetrical axis, and the shape of the image photographed through the image passing hole onto the film strip being similar to that of the image passing hole; and at least one mark provided at the plate mask in a manner to be asymmetrical with respect to the symmetrical axis of the image passing hole, whereby an individual imaged film frame can be viewed in a correct position.

2. An endoscope according to claim 1, in which said mark is a projection provided at the inner periphery of the image passing hole of the plate mask.

3. An endoscope according to claim 1, in which said mark is provided in that portion of the mask plate which is in the neighborhood of the image passing hole of the mask plate.

4. An endoscope according to claim 1, in which said image passing hole of the plate mask is rectangular in shape.

5. An endoscope according to claim 4, in which said mark is a triangular projection provided at one corner of the rectangular-shaped image passing hole of the plate mask.

6. An endoscope according to claim 1, in which said image passing hole of the plate mask is spherical in shape.

7. An endoscope according to claim 1, in which said optical means is an object lens arranged in front of the mask within the distal end section and along the optical axis of the image; said photographing means includes a film loaded cassette, illumination lamp and light sensitive element all housed within the distal end section.

8. An endoscope according to claim 7, further comprising a wire having one end anchored to the free end of the film strip so as to deliver the film strip along the length of the distal end section from the cassette, and the other end extending through a flexible tube section into the control unit; and a lever provided at the control unit so as to deliver the film strip frame by frame from the cassette.

9. An endoscope according to claim 1, in which said plate mask is located within the control unit; and said optical means further includes an objective lens arranged within the distal end section and an image guide arranged opposite to the plate mask and having one end facing the lens and the other end extending through a flexible tube section into the control unit.

* * * * *